Patented Feb. 7, 1950

2,496,963

UNITED STATES PATENT OFFICE 2,496,963

METHOD OF HEAT SEALING RUBBER HYDROCHLORIDE

James E. Snyder, Akron, Ohio, assignor to Wingfoot Corporation, Akron, Ohio, a corporation of Delaware No Drawing. Application February 10, 1947, Serial No. 727,737

5 Claims. (Cl. 154—116)

1

This invention relates to the use of new heat-sealing agents to facilitate the union of heat-sealable films by heat and pressure. The heat-sealing agents are applied to the film surfaces. Different agents will be used with films of different composition.

Under certain conditions there are disadvantages in heat-sealing films without the aid of a sealing agent. For instance, when rubber hydrochloride film is heated, it becomes soft and tacky. If packages are formed by heat-sealing, they stick to one another if they are stacked on completion of the sealing operation and a heat-softened area of one package contacts an adjacent package. Thus, it is desirable at times not to heat the film to the softening temperature in order to effect a seal. Lower temperatures may be used if a solvent is applied to one or both of the surfaces which are to be sealed, and if the solvent is applied only to the inner and not to the outer or exposed surface of the package, adjacent packages will not adhere to one another. The lower temperature will soften the inner contacting rubber hydrochloride surface to which the solvent has been applied, and the same permanent weld will be formed as at higher temperatures in the absence of solvent but without softening the untreated outer surface.

When a seal is formed with a lower boiling solvent, such as benzene or chloroform or the like, the solvent rapidly evaporates. In food and tobacco factories, etc., the vapors resulting from the formation of such a seal are objectionable. This difficulty is overcome by using as a solvent a high boiling material which does not evaporate on heating to the temperature required for sealing but merely penetrates into the film. Accordingly, this invention relates to using as sealing agents materials which boil at a temperature above that to which the film is heated in sealing.

Suitable sealing agents for rubber hydrochloride film are, for example, dibutyl phthalate, trioctyl phosphate, tricresyl phosphate, triglycol dichloride, methyl stearate, dioctyl phthalate, etc., and mixtures thereof. These produce seals at temperatures below that at which rubber hydrochloride softens. The preferred sealing agent is a mixture of about 20 per cent dibutyl phthalate and 80 per cent triglycol dichloride, ClCH2CH2OCH2CH2OCH2CH2Cl (by volume). This mixture produces good seals between rubber hydrochloride surfaces at a temperature about 10 degrees below that required when dibutyl phthalate is used alone.

2

It is desirable that a minimum amount of the sealing agent be used. This may be effected by adding to the sealing agent a low boiling volatile diluent which is not objectionable for use in tobacco or food processing factories, etc., such as alcohol or acetone. For example, a mixture of 80 per cent ethanol and 20 per cent dibutyl phthalate (by volume) may be used satisfactorily in sealing rubber hydrochloride surfaces, and such a solution is cheaper than the dibutyl phthalate alone. The ethanol volatilizes in the heat-sealing operation and has no lasting effect on the seal produced. Excess of the active sealing agent is to be avoided because it produces wrinkled seams and has other undesirable effects.

The nature of the seal formed depends upon the temperature used, the duration of the heat-sealing operation, and the particular solvent employed. The seal may be a permanent, inseparable weld, or it may be an easily separable union, such as is desirable across the top of a cigarette or other package where it is desired to have a seal which may be opened more easily than a permanent weld.

The heat-sealing agents must be soluble in the film material, and to be satisfactory for use in carrying out this invention, they must boil at a temperature above that employed for sealing. Materials used as plasticizers will, in general, be satisfactory. For the film known as Saran, which is a copolymer of vinyl chloride and vinylidene chloride, benzyl benzoate, dibutyl phthalate, and triglycol dichloride gave good seals at about 290° F. In the absence of a heat-sealing agent no substantial seal is obtained on Saran at 290° F. or below.

The polyethylene film marketed as Polythene gives no substantial seal at 210° F. or below. However, when treated with benzyl benzoate, it gives a very satisfactory seal at this temperature. Using polyamyl naphthalene and using diamyl naphthalene, good seals were obtained at 190–195° F.

To carry out the invention, as, for example, in the manufacture of a tobacco pouch of rubber hydrochloride film, opposed surfaces of the film where the longitudinal seam of the pouch is to be formed are treated with a narrow strip of the mixture of 80 per cent triglycol dichloride and 20 per cent of dibutyl phthalate, or other sealing agent. The seams of the pouch are then brought together and heated, for example, to a temperature of perhaps 150° F. as pressure is applied for a period of approximately two seconds, during which the sealing agent is at least partially absorbed into the rubber hydrochloride film. Excess sealing agent which is not absorbed during the brief period in which it is heated will be absorbed into the film thereafter. As the warm surface of the film absorbs the sealing agent, it softens; and this occurs while the softened area is in pressure contact with the similarly softened area of the opposed film surface. Thus, the opposed treated surfaces are united without raising either the surrounding film or the back side of the treated areas to the temperature at which they become soft and tacky. A shorter heat-sealing time may be used by raising the temperature, but the film is never heated to the temperature required to soften an untreated area. The two films are thus united over the areas treated with the sealing agent. The sealing agent is quickly dispersed in the film, and since the amount of sealing agent used is inappreciable as compared with the entire weight of the pouch, there is no appreciable permanent change in the properties of the film after it cools.

The pressure is usually applied with heated plates which are brought to bear against the outside surfaces of the film. The film is thus heated while the pressure is applied. Without the use of the sealing agent, it would be necessary to heat the outer surfaces of the rubber hydrochloride film to the temperature at which it becomes tacky in order to effect a seal. By heating to the lower temperature which is all that is required when a sealing agent is utilized, the seal is effected without rendering the outer surfaces of the pouch tacky. This prevents any tendency of the pouches to adhere to one another when they are stored or shipped.

Another useful application of the invention is in the packaging of articles in heat-sealable films on packaging machinery which forms heat-seals by sliding contact. For instance, most of the cigarette-package wrapping machines are presently equipped with stationary hot plates which seal the present wrappers by sliding contact. Such sealing is not applicable to packages formed of rubber hydrochloride film, for example, because the temperature required to obtain a seal (without using a sealing agent) causes the contacted surface of the seam to become tacky, preventing sliding contact with the heater. No volatile sealing agents suitable for sealing rubber hydrochloride films are known which are acceptable for use in a tobacco factory. All are too odorous or toxic. The sealing agents of this invention effect a seal at a low enough temperature to permit sliding contact of the outer, untreated surface of the rubber hydrochloride film with the stationary hot plate of such wrapping machines and without polluting the atmosphere with undesirable vapors.

Thus, there are widely different situations in which the invention is applicable. Likewise, it is applicable to the heat-sealing of all heat-sealable wrapping materials.

What I claim is:

1. The method of uniting rubber hydrochloride surfaces which comprises treating with a solvent at least one of the surfaces to be united while leaving an adjacent area untreated and pressing the surfaces together and heating them including the untreated area to a temperature below that at which the untreated rubber hydrochloride becomes tacky but high enough to effect a seal with the treated surface, said solvent being nonvolatile at said temperature but being dissolved into the film surface by such treatment whereby the treated surface becomes tacky and the surfaces are united without rendering the untreated area tacky.

2. The method of uniting rubber hydrochloride surfaces which comprises treating an area of at least one of the surfaces to be united with a mixture of about 20 per cent dibutyl phthalate and 80 per cent triglycol dichloride (by volume) and pressing the surfaces together and heating them to a temperature below that at which the mixture is volatile but high enough to render the treated surface heat sealing and heating until a seal is effected but without heating until the areas of untreated rubber hydrochloride become tacky.

3. The method of uniting surfaces of rubber hydrochloride film which comprises treating with a solvent at least one of the surfaces to be united and then pressing the surfaces together and heating an exposed surface of the film to a temperature below that at which the rubber hydrochloride becomes tacky and below that at which the solvent is volatile, but to a temperature which renders the treated surface tacky, whereby the surfaces are united.

4. The method of forming a seal between two surfaces of heat-sealable wrapping material which comprises treating with a solvent at least one of the surfaces to be united while leaving an adjacent area untreated and pressing the surfaces together and heating them to a temperature below that at which the untreated area becomes tacky but sufficient to render the treated surface tacky, said solvent being nonvolatile at said temperature but being dissolved into the surface of the wrapping material by such treatment, whereby the surface becomes tacky and the surfaces are united.

5. The method of forming a seal between surfaces of a heat-sealable wrapping film which comprises treating with a solvent at least one of the surfaces to be united and then pressing the surfaces together and heating an exposed surface of the film, thereby heating said exposed surface to a temperature below that at which the film becomes tacky and below that at which the solvent is volatile, but to a temperature which renders the treated surface tacky, whereby the surfaces are united.

JAMES E. SNYDER.

REFERENCES CITED

The following references are of record in the file of this patent:

UNITED STATES PATENTS

| Number | Name | Date |
|---|---|---|
| 1,903,960 | Dreyfus | Apr. 18, 1933 |
| 2,046,986 | Winkelmann | July 7, 1936 |
| 2,273,452 | Snyder | Feb. 17, 1942 |
| 2,309,575 | Coes | Jan. 26, 1943 |
| 2,343,975 | Hosfield | Mar. 14, 1944 |
| 2,363,617 | Patrick | Nov. 28, 1944 |